(12) United States Patent
Serkh et al.

(10) Patent No.: US 10,774,906 B2
(45) Date of Patent: Sep. 15, 2020

(54) TENSIONER

(71) Applicant: Gates Corporation, Denver, CO (US)

(72) Inventors: Alexander Serkh, Troy, MI (US);
Anthony R. Mora, Waterford, MI (US)

(73) Assignee: Gates Corporation, Denver, CO (US)

( * ) Notice: Subject to any disclaimer, the term of this patent is extended or adjusted under 35 U.S.C. 154(b) by 352 days.

(21) Appl. No.: 15/936,699

(22) Filed: Mar. 27, 2018

(65) Prior Publication Data

US 2019/0301572 A1    Oct. 3, 2019

(51) Int. Cl.
| | | |
|---|---|---|
| *F16H 7/12* | (2006.01) | |
| *F16H 7/02* | (2006.01) | |
| *F16H 7/08* | (2006.01) | |

(52) U.S. Cl.
CPC .............. *F16H 7/129* (2013.01); *F16H 7/023* (2013.01); *F16H 7/0848* (2013.01); *F16H 7/1281* (2013.01); *F16H 2007/081* (2013.01); *F16H 2007/0844* (2013.01); *F16H 2007/0865* (2013.01); *F16H 2007/0874* (2013.01); *F16H 2007/0893* (2013.01)

(58) Field of Classification Search
CPC ...... F16H 7/0848; F16H 7/1281; F16H 7/129; F16H 2007/0874
See application file for complete search history.

(56) References Cited

U.S. PATENT DOCUMENTS

| | | |
|---|---|---|
| 1,338,293 A | 4/1920 | Fuchs |
| 1,579,245 A | 4/1926 | Pennington |
| 1,701,820 A * | 2/1929 | Morse ..................... F16H 7/129 474/112 |
| 2,066,721 A * | 1/1937 | Eaton ..................... F16H 7/1281 474/109 |
| 2,352,797 A | 7/1944 | Miller |
| 2,726,364 A | 12/1955 | Merritt |
| RE27,861 E | 1/1974 | Kraus |
| 4,416,647 A | 11/1983 | White |
| 4,758,208 A | 7/1988 | Bartos et al. |

(Continued)

FOREIGN PATENT DOCUMENTS

| | | |
|---|---|---|
| DE | 102005039719 A1 | 3/2007 |
| JP | 2005537439 A | 12/2005 |

OTHER PUBLICATIONS

European Patent Office, International Search Report and Written Opinion of the International Searching Authority, International application No. PCT/US2019/022752, dated May 23, 2019.

*Primary Examiner* — Minh Truong
(74) *Attorney, Agent, or Firm* — Paul N. Dunlap, Esq.

(57) ABSTRACT

A tensioner comprising a base, a first tensioner subassembly pivotally mounted to the base, a second tensioner subassembly pivotally mounted to the base, a tensile member joining the first tensioner subassembly and the second tensioner subassembly, the first tensioner subassembly urged in a direction opposite the second tensioner subassembly, and a one-way clutch frictionally engaged with the first tensioner subassembly whereby a relative movement of the first tensioner subassembly away from the second tensioner subassembly is restricted for a first predetermined operating condition and a relative movement of the first tensioner subassembly toward the second tensioner subassembly is not restricted for a second predetermined operating condition.

8 Claims, 12 Drawing Sheets

(56) References Cited

U.S. PATENT DOCUMENTS

| | | |
|---|---|---|
| 4,822,322 A * | 4/1989 | Martin .................... F16H 7/129 474/135 |
| 4,981,116 A | 1/1991 | Trinquard |
| 6,609,989 B2 | 8/2003 | Berger et al. |
| 6,648,783 B1 | 11/2003 | Bogner |
| 6,652,401 B2 | 11/2003 | Liu |
| 6,960,145 B2 | 11/2005 | Fraley et al. |
| 7,494,434 B2 | 2/2009 | McVicar et al. |
| 7,901,310 B2 | 3/2011 | Lolli et al. |
| 8,057,334 B2 | 11/2011 | Kotzur |
| 8,092,328 B2 | 1/2012 | Dec et al. |
| 8,327,972 B1 | 12/2012 | Schneider et al. |
| 8,353,795 B2 | 1/2013 | Montani et al. |
| 8,439,780 B2 | 5/2013 | Ruffini et al. |
| 8,602,930 B2 | 12/2013 | Deneszczuk et al. |
| 8,813,928 B2 | 8/2014 | Schneider et al. |
| 8,821,328 B2 | 9/2014 | Jud et al. |
| 9,140,338 B2 * | 9/2015 | Serkh .................... F16H 7/1281 |
| 9,341,243 B2 * | 5/2016 | Replete ................. F16H 7/0829 |
| 2002/0039944 A1 | 4/2002 | Ali et al. |
| 2002/0086751 A1 | 7/2002 | Bogner et al. |
| 2003/0109342 A1 | 6/2003 | Oliver et al. |
| 2003/0153421 A1 | 8/2003 | Liu |
| 2003/0176249 A1 | 9/2003 | Polster et al. |
| 2003/0176250 A1 | 9/2003 | Austin et al. |
| 2003/0199350 A1 | 10/2003 | Henry |
| 2003/0216203 A1 | 11/2003 | Oliver et al. |
| 2003/0220164 A1 | 11/2003 | Tamai |
| 2004/0043854 A1 | 3/2004 | Fraley et al. |
| 2004/0072642 A1 | 4/2004 | Serkh |
| 2005/0181901 A1 | 8/2005 | Shin |
| 2006/0100051 A1 | 5/2006 | Di Giacomo et al. |
| 2006/0217222 A1 | 9/2006 | Lolli et al. |
| 2006/0287146 A1 | 12/2006 | McVicar et al. |
| 2007/0037648 A1 | 2/2007 | Di Giacomo et al. |
| 2007/0099737 A1 * | 5/2007 | Hallen .................... F16H 7/129 474/101 |
| 2008/0070730 A1 | 3/2008 | Nelson et al. |
| 2008/0176687 A1 | 7/2008 | Scheyer |
| 2008/0214342 A1 | 9/2008 | Montani et al. |
| 2011/0177897 A1 | 7/2011 | Ward et al. |
| 2011/0256969 A1 | 10/2011 | Frankowski et al. |
| 2011/0256971 A1 | 10/2011 | Kilshaw |
| 2011/0294612 A1 | 12/2011 | Kato |
| 2012/0318589 A1 | 12/2012 | Stanley et al. |
| 2013/0040770 A1 | 2/2013 | Wolf et al. |
| 2013/0203535 A1 | 8/2013 | Mack et al. |
| 2013/0260932 A1 | 10/2013 | Adam et al. |
| 2015/0219189 A1 | 8/2015 | Serkh |
| 2015/0285366 A1 * | 10/2015 | Serkh ....................... F16D 3/12 474/94 |
| 2015/0300462 A1 | 10/2015 | Serkh |
| 2017/0037940 A1 | 2/2017 | Serkh et al. |

\* cited by examiner

TENSIONER

FIELD OF THE INVENTION

The invention relates to a tensioner, and more particularly, to a tensioner having a first sub-assembly cooperatively engaged with a second sub-assembly through an elongate flexible member and a one-way clutch, a first torsion spring and a second torsion spring exert a tensile load on the elongate flexible member, and the one-way clutch frictionally engaged with a first pivot arm whereby a relative movement of the first pivot arm away from a second pivot arm is restricted.

BACKGROUND OF THE INVENTION

Belt tensioners are used to impart a load on a belt. The belt load prevents the belt from slipping on one or more entrained pulleys during operation. Typically the belt is used in an engine application for driving various accessories associated with the engine. For example, an air conditioning compressor and alternator are two of the accessories that may be driven by a belt drive system.

A belt tensioner comprises a pulley journalled to an arm. A spring is connected between the arm and a base. The spring may also engage a damping mechanism. The damping mechanism comprises frictional surfaces in contact with each other. The damping mechanism damps an oscillatory movement of the arm caused by operation of the belt drive. This in turn enhances belt life expectancy.

In order to increase fuel economy and efficiency, many automotive manufacturers are beginning to incorporate alternators with the capability to drive the accessory belt drive system (ABDS). Such alternators are commonly referred to motor generator units (MGU's) or belt starter generators (BSG's). These can be used to start the engine, charge the battery, or boost the vehicle. During standard operation, the crankshaft pulley drives the ABDS. When this is the case, the tight side is the side of the belt that is entering the crank pulley, and the slack side is the side that is coming off of the crank pulley. However, when the MGU is used to drive the system (such as during starting), the tight side becomes the side of the belt entering the MGU, and the slack side is the side of the belt leaving the MGU and entering the crank pulley.

Representative of the art is U.S. Pat. No. 9,140,338 which discloses a tensioner comprising a base, a first pivot arm pivotally engaged to the base, a first pulley journalled to the first pivot arm, a second pivot arm pivotally engaged to the base, a second pulley journalled to the second pivot arm, a flexible tensile member having a toothed engagement with the first pivot arm and a toothed engagement with the second pivot arm whereby the first pivot arm and the second pivot arm move in a coordinated manner, and a tensioner assembly pivotally engaged to the base and engaged with the flexible tensile member.

What is needed is a tensioner having a first sub-assembly cooperatively engaged with a second sub-assembly through an elongate flexible member and a one-way clutch, a first torsion spring and a second torsion spring exert a tensile load on the elongate flexible member, and the one-way clutch frictionally engaged with a first pivot arm whereby a relative movement of the first pivot arm away from a second pivot arm is restricted. The present invention meets this need.

SUMMARY OF THE INVENTION

The primary aspect of the invention is to provide a tensioner having a first sub-assembly cooperatively engaged with a second sub-assembly through an elongate flexible member and a one-way clutch, a first torsion spring and a second torsion spring exert a tensile load on the elongate flexible member, and the one-way clutch frictionally engaged with a first pivot arm whereby a relative movement of the first pivot arm away from a second pivot arm is restricted.

Other aspects of the invention will be pointed out or made obvious by the following description of the invention and the accompanying drawings.

The invention comprises a tensioner comprising a base, a first tensioner subassembly pivotally mounted to the base, a second tensioner subassembly pivotally mounted to the base, a tensile member joining the first tensioner subassembly and the second tensioner subassembly, the first tensioner subassembly urged in a direction opposite the second tensioner subassembly, and a one-way clutch frictionally engaged with the first tensioner subassembly whereby a relative movement of the first tensioner subassembly away from the second tensioner subassembly is restricted for a first predetermined operating condition and a relative movement of the first tensioner subassembly toward the second tensioner subassembly is not restricted for a second predetermined operating condition.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
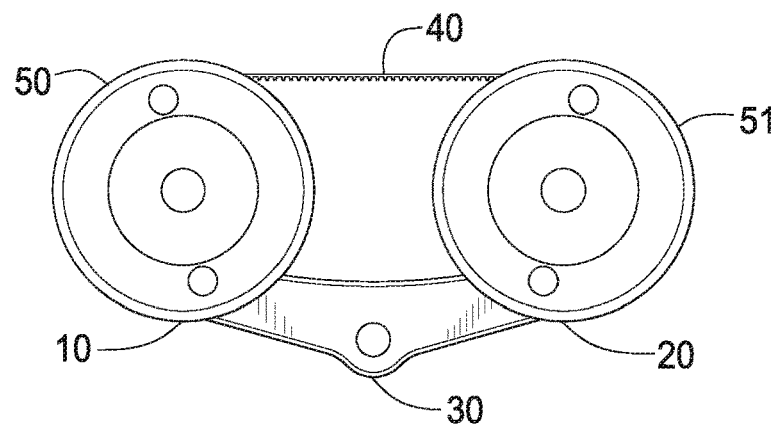
FIG. 1 is a top view of the tensioner.

FIG. 1 is a top view of the tensioner. The inventive tensioner comprises two sub-assemblies, namely, a first tensioner sub-assembly 10 and a second tensioner sub-assembly 20. Each sub-assembly is pivotally mounted to a mounting bracket 30. A flexible elongate toothed belt or linkage member 40 connects the two sub-assemblies.

Figure 2:
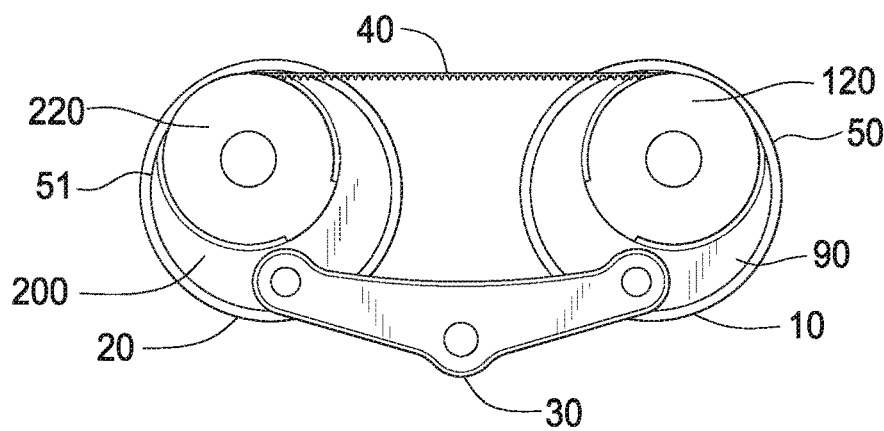
FIG. 2 is a bottom view of the tensioner.

FIG. 2 is a bottom view of the tensioner. Bracket 30 is used to attach the tensioner to a mounting surface (not shown).

Figure 3:
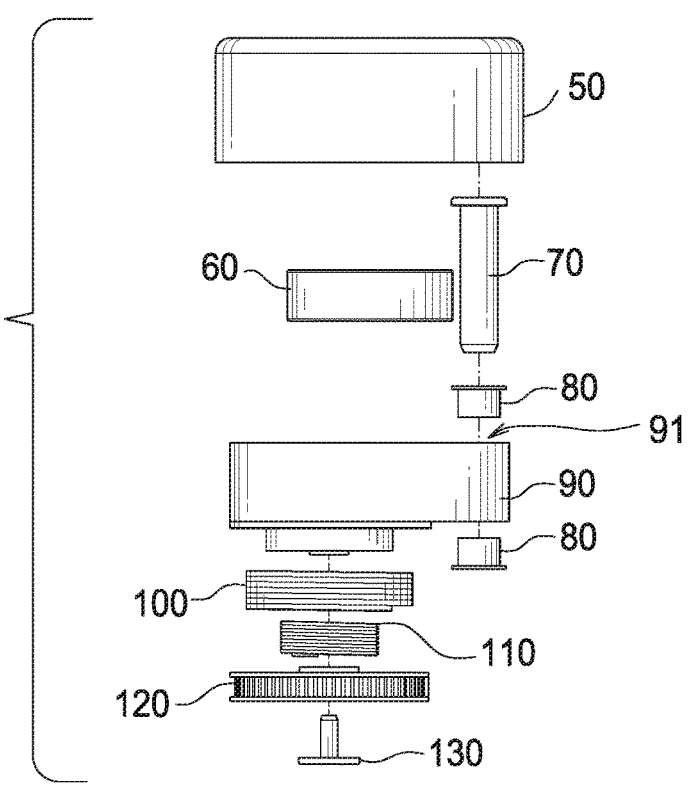
FIG. 3 is a sub-assembly exploded view.

FIG. 3 is a sub-assembly exploded view. The first tensioner sub-assembly comprises a first pulley 50, bearing 60, pivot pin 70, bushing 80, first pivot arm 90, compensating spring 100, wrap spring 110, first sprocket 120 and rivet 130. Bearing 60 is press fit onto pulley 50 with an interference fit between shaft surface 53 of pulley 50 and the inner race 62 of bearing 60. An end 52 of pulley 50 is swaged onto and over the bottom of inner race 62.

Bushings 80 are placed into the first pivot arm 90 with a slip fit between the inner surface of hole 91 and an outside surface 81 of bushing 80. Pivot pin 70 is placed through the hole 91 of first pivot arm 90 and bushings 80 with a tight slip fit between pin outer surface 71 and an inner bushing surface 82, thereby locking each bushing in place on pivot pin 70. Pivot arm 90 pivots about pin 70. Pin 70 is press fit into bracket 30.

Figure 4:
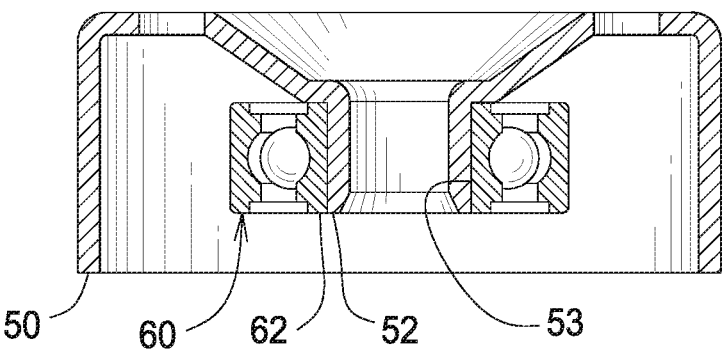
FIG. 4 is a cross-sectional pulley bearing assembly view.

FIG. 4 is a cross-sectional pulley bearing assembly view. The pulley-bearing assembly 50, 60 is pressed into first pivot arm 90 with a small clearance fit between the outer race 64 of the bearing and an inner surface 93 of first pivot arm 90. First pivot arm top surface 92 is swaged onto and over the top surface of outer race 64.

Figure 5:
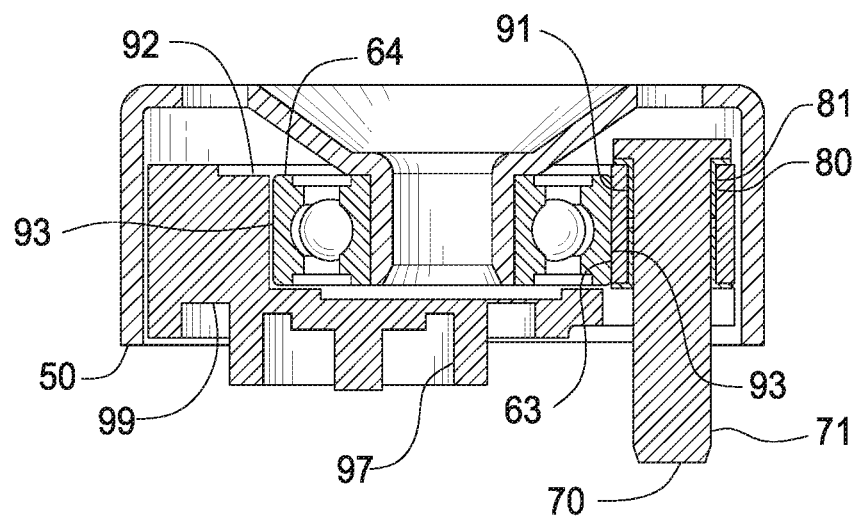
FIG. 5 is a cross-sectional view of the arm-pulley assembly.

FIG. 5 is a cross-sectional view of the arm-pulley assembly. Arm 90 pivots about pivot pin 70 on bushings 80.

Figure 6:
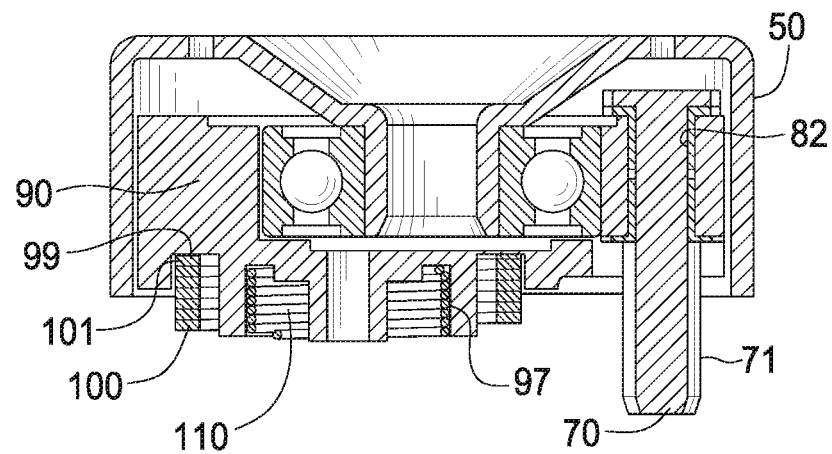
FIG. 6 is a cross-sectional view of the pulley-arm assembly with compensating spring and wrap spring.

FIG. 6 is a cross-sectional view of the pulley-arm assembly with compensating spring and wrap spring. An outer surface of wrap spring 110 is frictionally disposed on a radially inner surface 97 of pivot arm 90. In an alternate embodiment, wrap spring 110 may comprise a sprague-type clutch. End 101 of spring 100 engages stop 99 on pivot arm 90.

Figure 7:
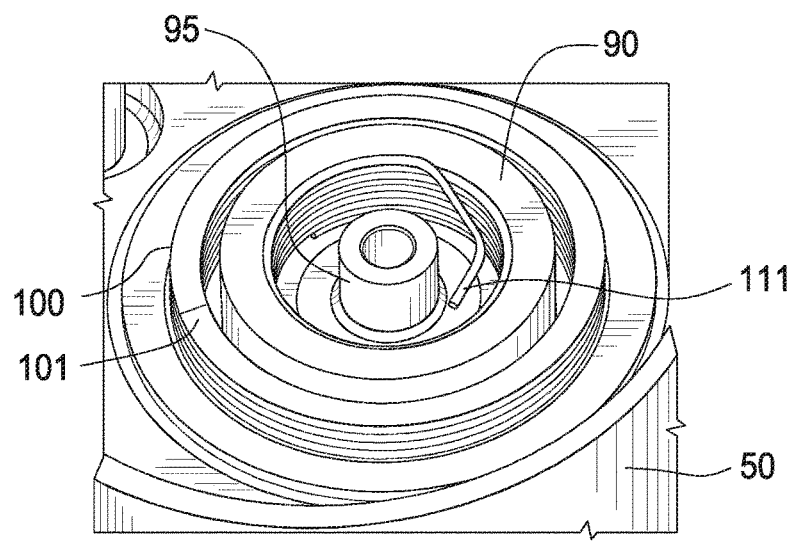
FIG. 7 is a perspective view of the compensating spring orientation.

FIG. 7 is a perspective view of the compensating spring orientation. Compensating spring 100 is disposed within first arm 90. In operation, compensating spring 100 is loaded in the unwinding direction.

Figure 8:
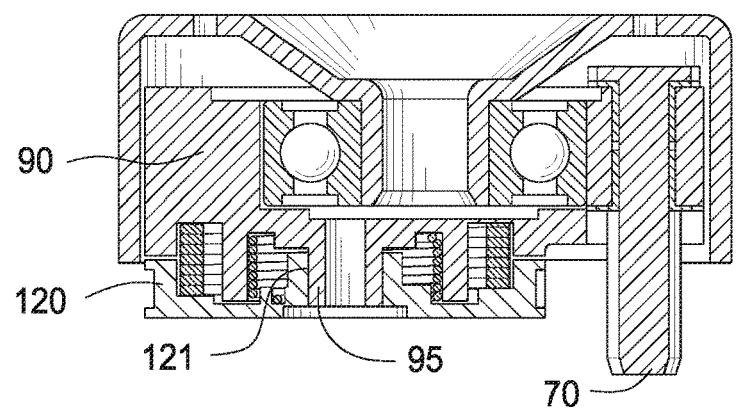
FIG. 8 is a cross-sectional view of a sub-assembly with sprocket.

FIG. 8 is a cross-sectional view of a sub-assembly with sprocket. First sprocket 120 rotationally engages first arm 90 by a slip fit between the first sprocket center bore 121 and first arm shaft 95.

Figure 9:
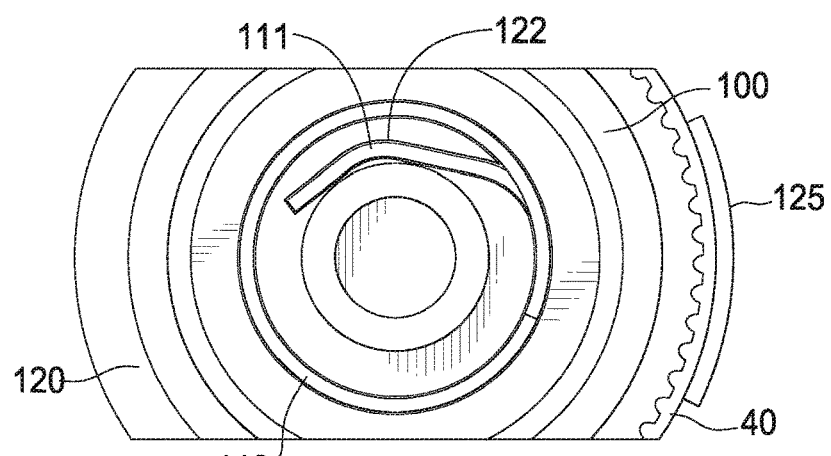
FIG. 9 is a plan view of a wrap spring orientation.

FIG. 9 is a plan view of a wrap spring orientation. Wrap spring tang 111 engages wrap spring tang receiver 122 in first sprocket 120. In operation, wrap spring 110 is loaded in an unwinding direction. Upon loading in the unwinding direction wrap spring 110 radially expands to frictionally grip an inner surface 97 of pivot arm 90, thereby restricting or preventing relative movement of the pivot arm 90 away from pivot arm 200 for a predetermined condition such as when the belt segment engaged by the first sub-assembly is the belt tight side.

Figure 10:
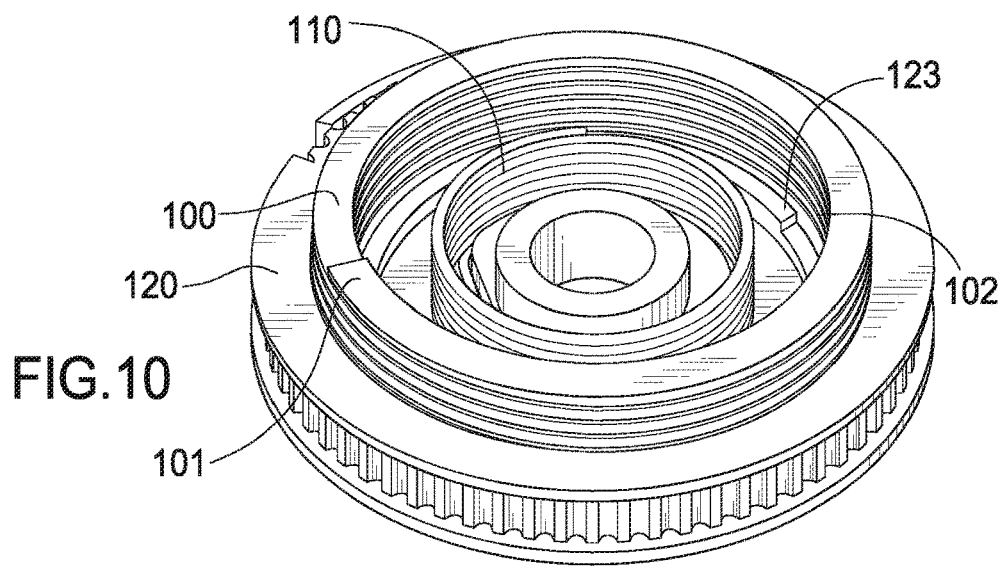
FIG. 10 is a perspective view of a compensating spring.

FIG. 10 is a perspective view of a compensating spring. Compensating spring 100 is installed in first sprocket 120 so that spring end 102 contacts first sprocket arm spring stop 123. Compensating spring 100 is a torsion spring.

Figure 11:
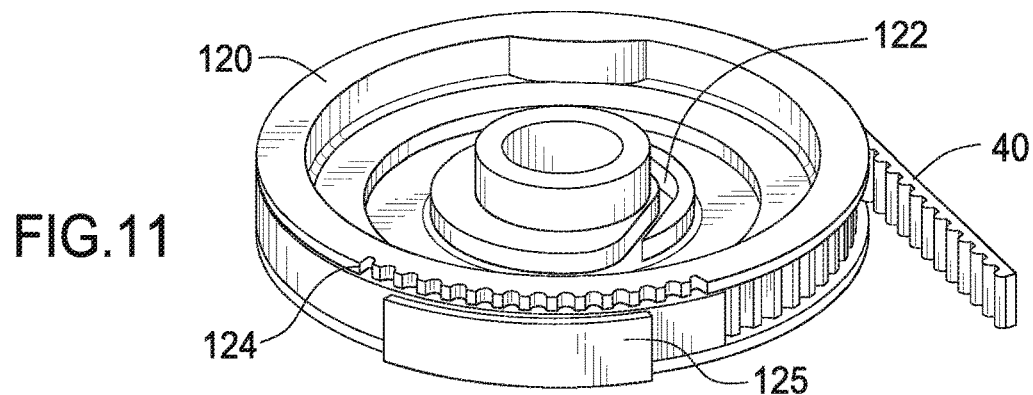
FIG. 11 is a perspective view of a sprocket-synchronous belt assembly.

FIG. 11 is a perspective view of a sprocket-synchronous belt assembly. Elongate toothed belt 40 engages first sprocket 120 through relief cut 124 and is held in place by member 125. Sprocket 120 comprises a toothed surface to engage toothed belt 40. However, a toothed surface on the belt and sprocket is not required as a flat belt, multi-ribbed belt or a suitable tensile member such as a wire or cord may be used with equal success.

Figure 12:
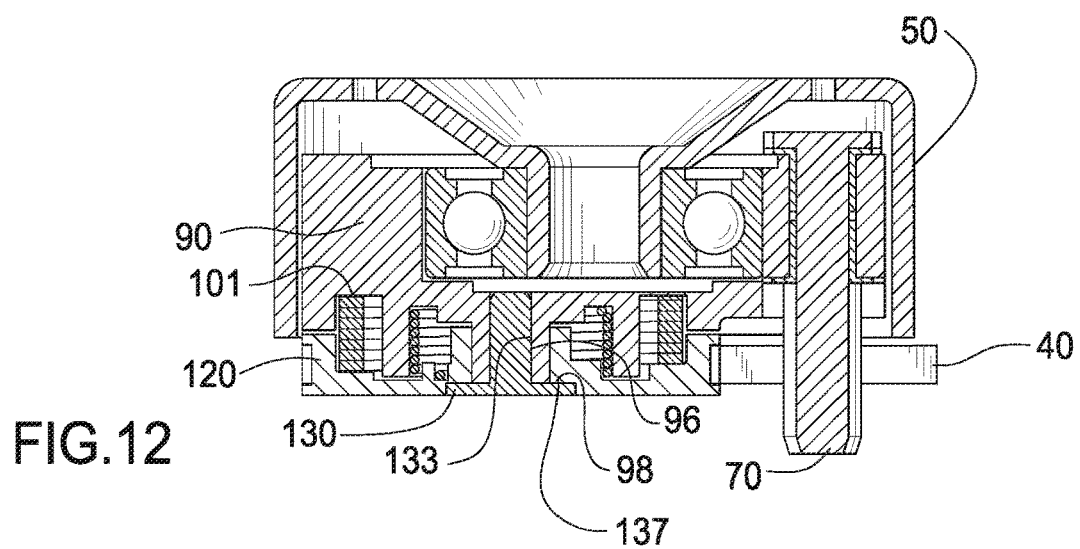
FIG. 12 is a cross-sectional view of a sub-assembly.

FIG. 12 is a cross-sectional view of a sub-assembly. Rivet 130 is pressed into first arm 90 between outside rivet surface 133 and first arm inner shaft surface 96. Rivet head bottom surface 137 makes contact with first sprocket rivet surface 98 to keep first sprocket 120 in place while allowing freedom of rotation.

Figure 13:
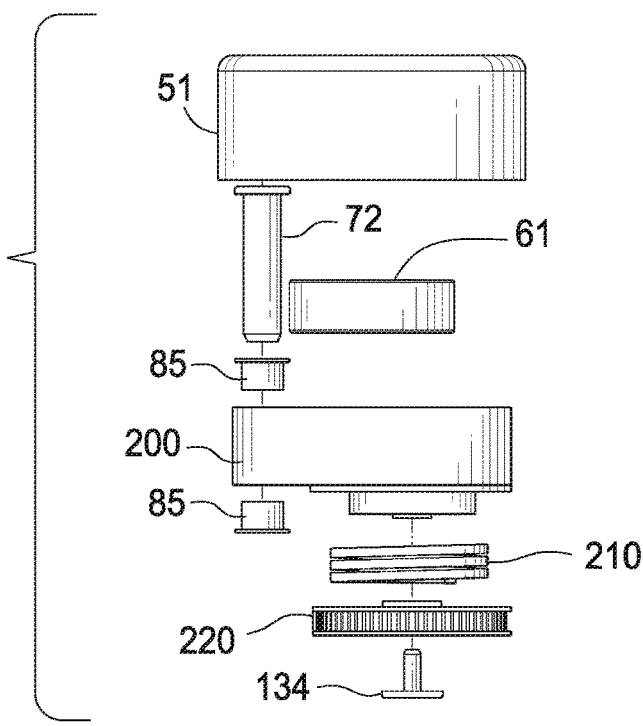
FIG. 13 is an exploded view of a second sub-assembly.

FIG. 13 is an exploded view of a second sub-assembly. The second tensioner sub-assembly comprises a second pulley 51, bearing 61, pivot pin 72, bushing 85, second pivot arm 200, primary spring 210, second sprocket 220, and rivet 134. Bearing 61 is press fit into pulley 51 between outside shaft surface 52 and the inner race 65 of bearing 61. An end of surface 52 is swaged onto and over inner race 65.

Primary spring 210 is loaded in a direction opposite that of compensating spring 100, thereby applying a tensile load to linkage belt 40.

Figure 14:
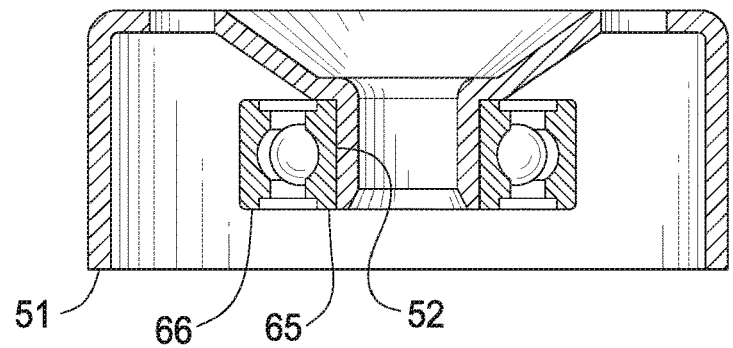
FIG. 14 is a cross-sectional view of a pulley-bearing assembly.

FIG. 14 is a cross-sectional view of a pulley-bearing assembly. The pulley-bearing assembly is placed into second pivot arm 200 with a small clearance fit between outer race 66 and inside surface 203 of second arm 200. Second arm top surface 202 is swaged onto and over the top surface of the outer race 66 of bearing 61.

Figure 15:
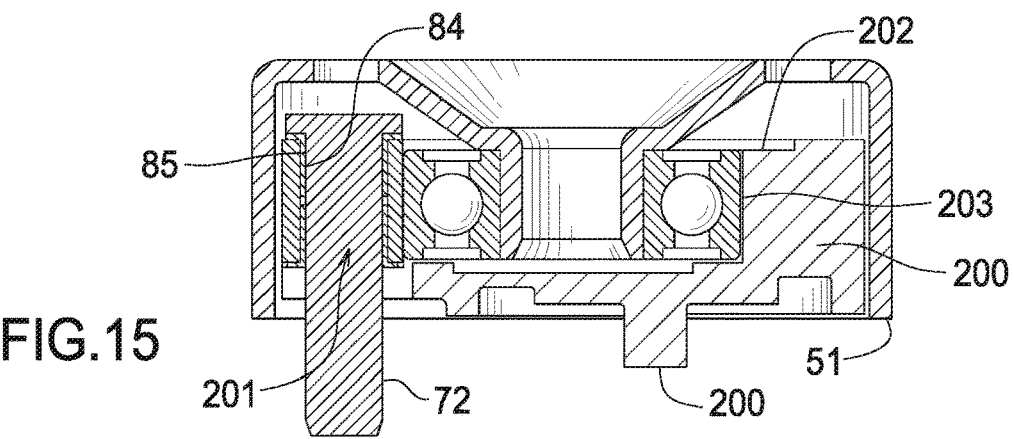
FIG. 15 is a cross-sectional view of am arm-pulley assembly.

FIG. 15 is a cross-sectional view of am arm-pulley assembly. Both bushings 85 are placed into the second arm 200 with a slip fit between inner surface of hole 201 and the outside surface of bushing 85. Pivot pin 72 is placed through hole 201 and bushings 85 with a tight slip fit between outer pin surface 72 and inner bushing surface 84, thereby locking the bushings to pivot pin 72.

Figure 16:
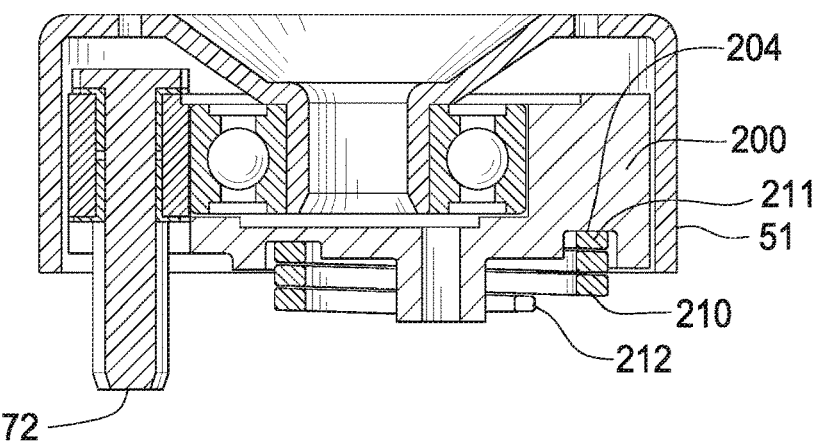
FIG. 16 is a cross-sectional view of an arm-pulley assembly with primary spring.

FIG. 16 is a cross-sectional view of an arm-pulley assembly with primary spring. Primary spring 210 is disposed within second pivot arm 200 so that primary spring end 211 contacts second arm spring stop 204.

Figure 17:
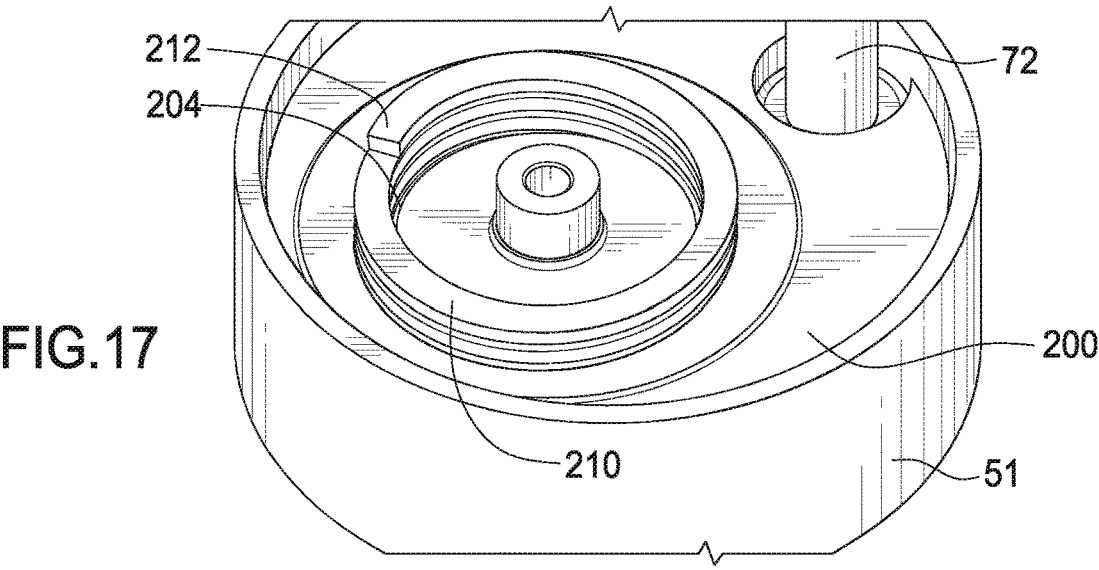
FIG. 17 is a perspective bottom view of a primary spring orientation.

FIG. 17 is a perspective bottom view of a primary spring orientation. Primary spring 210 is loaded in the unwinding direction.

Figure 18:
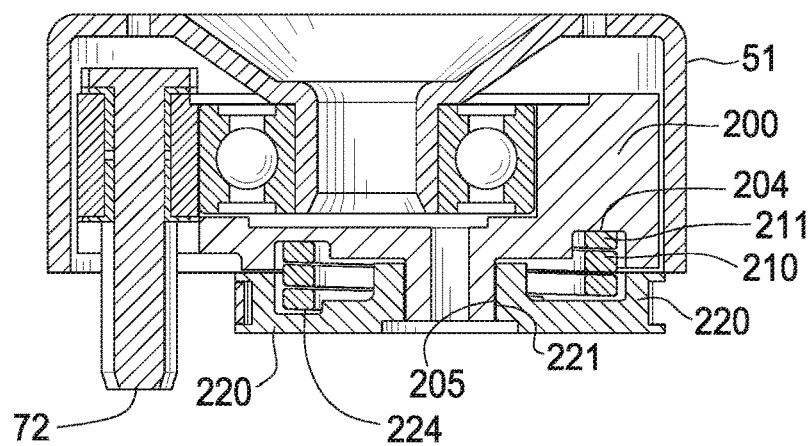
FIG. 18 is a cross-sectional view of a sub-assembly with sprocket.

FIG. 18 is a cross-sectional view of a sub-assembly with sprocket. Second sprocket 220 is rotationally installed on the second arm 200 by a slip fit between second sprocket center bore 221 and second pivot arm shaft 205. End 212 of spring 210 engages stop 224 in sprocket 220.

Figure 19:
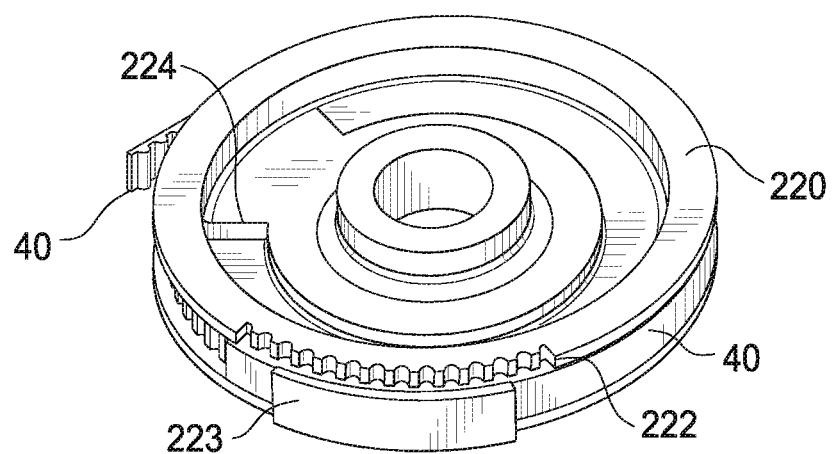
FIG. 19 is a perspective view of a sprocket-synchronous belt assembly.

FIG. 19 is a perspective view of a sprocket-synchronous belt assembly. An end of belt 40 is placed onto second sprocket 220 through relief cut 222 and held in place by member 223.

Figure 20:
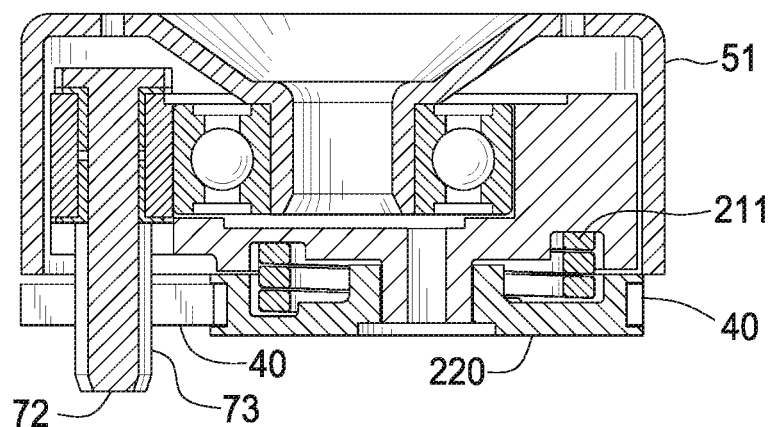
FIG. 20 is a cross-sectional view of a sub-assembly with belt.

FIG. 20 is a cross-sectional view of a sub-assembly with synchronous belt. Belt 40 is engaged with sprocket 220. Outer surface 73 of pin 72 engages bushing 85.

Figure 21:
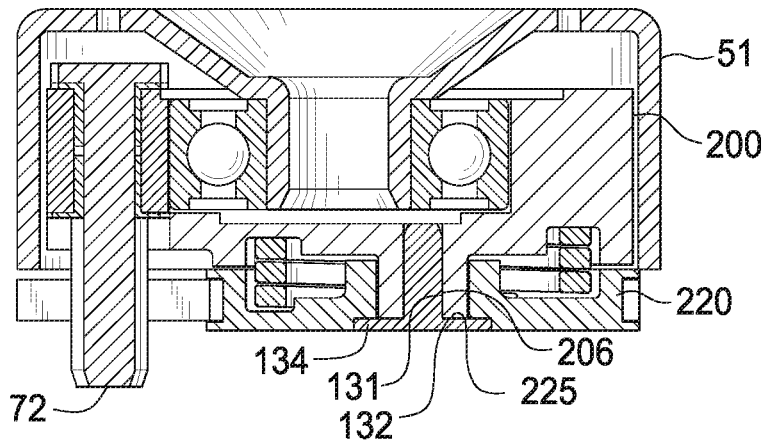
FIG. 21 is a cross-sectional view of a sub-assembly.

FIG. 21 is a cross-sectional view of a sub-assembly. Rivet 134 pressed into second arm 200 between outside rivet surface 131 and second arm inner shaft surface 206. Rivet head bottom surface 132 makes contact with second sprocket rivet surface 225 to keep second sprocket 220 in place while allowing freedom of rotation.

Figure 22:
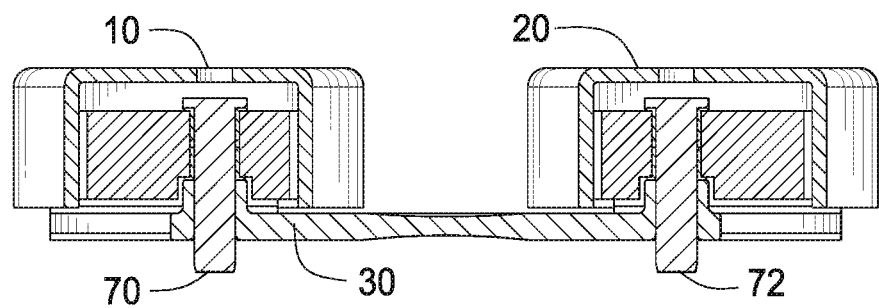
FIG. 22 is a cross-sectional view of the tensioner.

FIG. 22 is a cross-sectional view of the tensioner. The first tensioner sub-assembly 10 and second tensioner sub-assembly 20 are pressed into bracket 30 with an interference fit with pins 70 and 72 respectively.

Operation

Since the slack side and tight side of the belt change during different modes of operation, the instant tensioner adapts to these changing conditions in order to properly control belt tension.

The inventive tensioner controls belt tension on both sides of the driver in order to respond to the alternating position of the slack side or tight side. The tensioner comprises a first tensioner sub-assembly and a second tensioner sub-assembly coupled by a flexible linkage. As belt tension grows, the tight side of the belt pushes the first tensioner sub-assembly out, thus loading the primary torsion spring. The load in the primary torsion spring is translated to the slack side second tensioner sub-assembly via the flexible linkage. This in turn causes the second tensioner sub-assembly pulley to be pulled into the slack side of the belt, which then increases the slack side tension. The slack compensating operation occurs regardless of which side of the belt happens to be slack (or tight) at a given time.

Figure 23A:
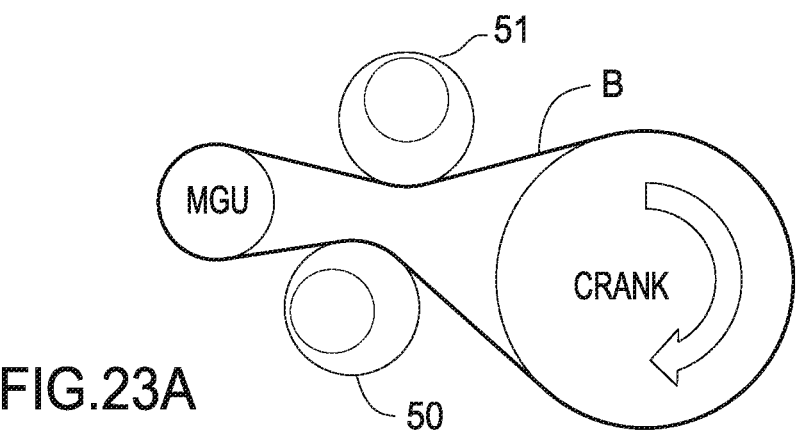
FIGS. 23A and 23B are diagrams of the tensioner with alternating belt slack side.
Figure 23B:
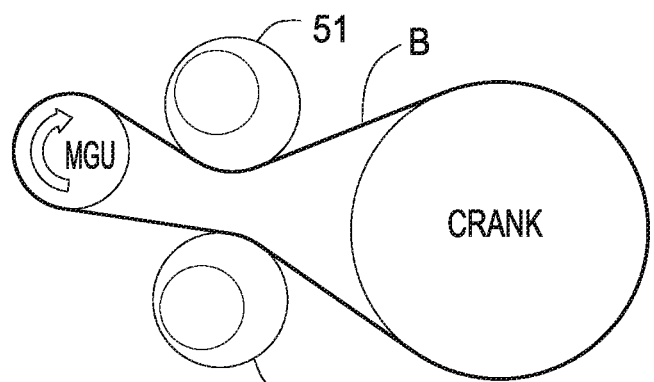

FIGS. 23A and 23B are diagrams of the tensioner with alternating belt slack side. Pulley 50 and pulley 51 engage belt B. Belt B is trained between crankshaft (crank) and the motor generator unit (MGU). While the crank is driving in the clockwise direction (FIG. 23A), pulley 51 is on the tight side of belt B. Pulley 50 is on the slack side. When the MGU is driving such as during stop start operation (FIG. 23B), pulley 50 is on the tight side of belt B and pulley 51 is on the slack side.

The angular movement of one pulley with respect to another is non-linear. That is, the tight side pulley (which can be either side of the tensioner for a given mode) will always move through a greater angle than the slack side pulley. This movement differential provides the primary spring 210 with sufficient load to properly tension the slack side.

Figure 24:
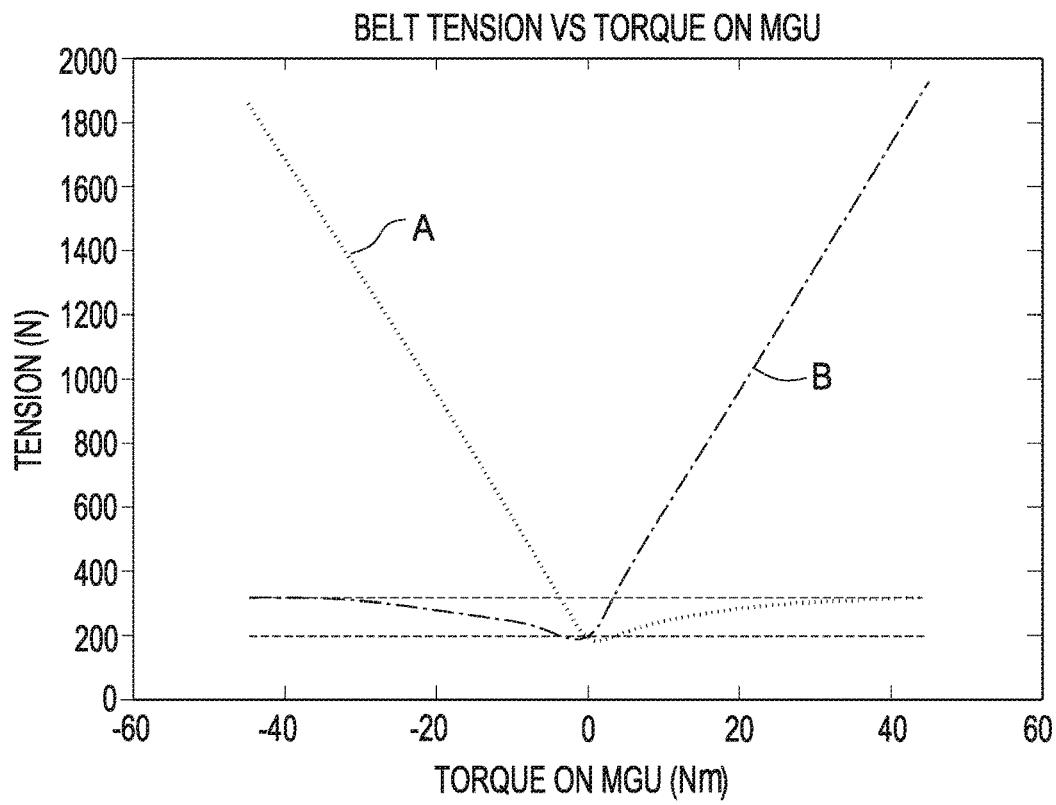
FIG. 24 illustrates belt tension as a function of torque on the MGU.

FIG. 24 illustrates belt tension as a function of torque on the MGU. Curve A and B represent tensions in each side of the belt. Curve A shows that the portion of the belt that is leaving, downstream, of the MGU is the tight side when torque is negative, namely the MGU is being driven by the crankshaft. Curve B shows that the portion of the belt that is leaving, downstream, of the crankshaft is the tight side when torque is positive, namely, when the crankshaft is being driven by the MGU.

The design is such that only when torque is small does tension in the slack side ever drop below installation tension (when torque equals zero). As tension grows linearly with torque in the tight side, it grows somewhat logarithmically in the slack side. This allows for slack side tension to be effectively controlled without introducing excessive installation tension that would tend to shorten the lifespan of the belt.

Figure 25:
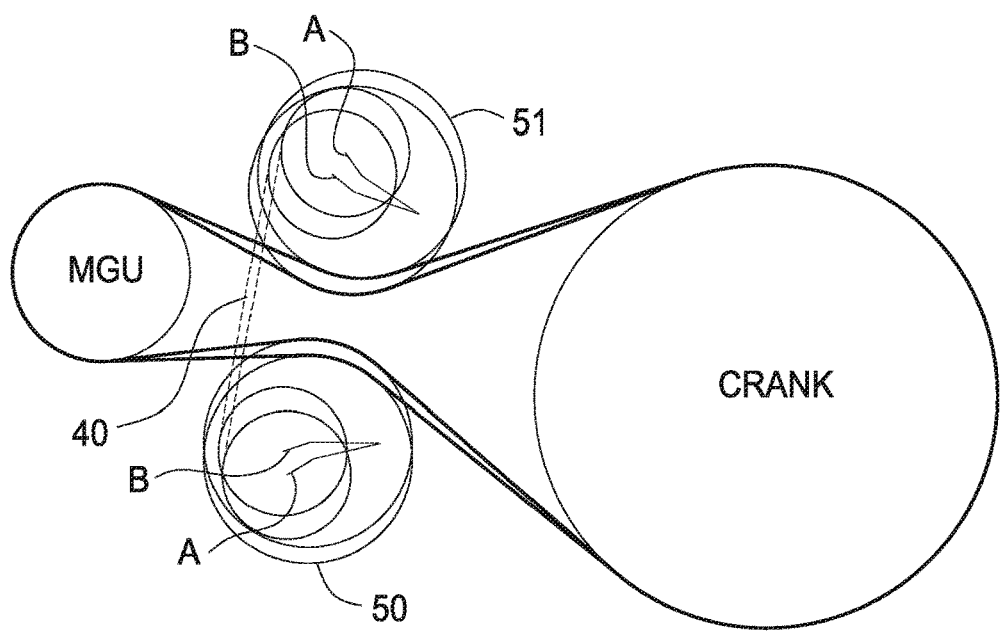
FIG. 25 is a diagram of tensioner response to belt elongation.

FIG. 25 is a diagram of tensioner response to belt elongation. Static installed belt length is subject to deviation from an as installed nominal length for two reasons: tolerance and wear. As a belt becomes longer than the nominal value during operation, the tensioner(s) must move further into the belt and thus lose some, and potentially all, of the original installation tension (preload), each from position A to position B. Prior art tensioners address this issue by being installed with excess preload such that the installed preload cannot then be entirely dissipated through belt elongation. However, in many cases such excess preload can result in excessive belt tension which ultimately reduces the lifespan of the belt. The inventive tensioner comprises a compensating mechanism that allows preload to be predictably restored in the event that it falls below a predetermined threshold.

The compensating mechanism is realized by pairing a one-way clutch wrap spring 110 and compensating spring 100 in the first tensioner sub-assembly 10. Wrap spring 110 is used to prevent sprocket 120 from rotating in the direction that would cause loss of preload, yet permits motion in the direction that increases preload. Once the preload of the primary spring 210 falls below the threshold, the tension in the linkage belt 40 drops. Once the linkage belt tension falls below the amount that is counterbalanced by the preload given to compensating spring 100, compensating spring 100 will wind sprocket 120, thus restoring equilibrium and some of the system preload.

Figure 26:
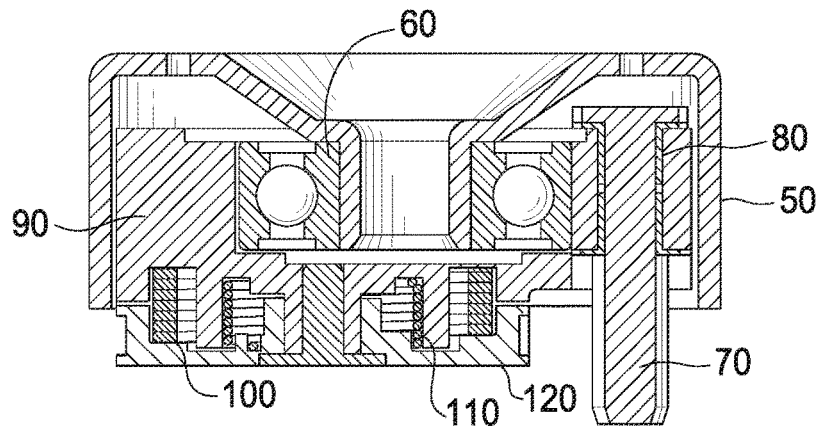
FIG. 26 is a detailed view of the compensating mechanism of the first subassembly.

FIG. 26 is a detailed view of the compensating mechanism of the first subassembly. Wrap spring 110 engages sprocket 120. Compensating spring 100 is engaged between sprocket 120 and pivot arm 90. Compensating spring 100 is loaded in an unwinding direction.

Figure 27:
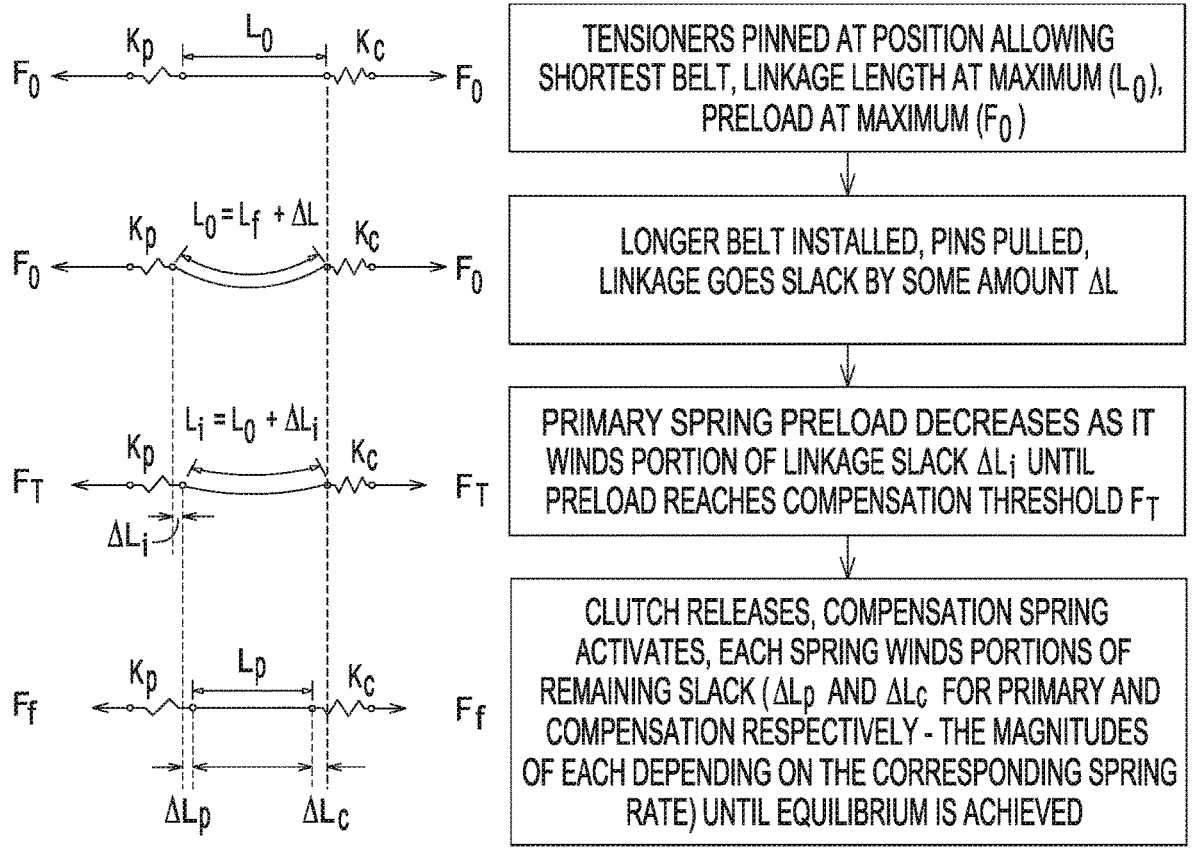
FIG. 27 is a schematic description of the compensation mechanism function.

FIG. 27 is a schematic description of the compensation mechanism function. By way of example and not of limitation, FIG. 27 illustrates a primary spring having spring rate $k_p$ and a compensating spring having spring rate $k_c$ connected by a linkage belt with maximum length of $L_0$. The linkage is loaded in tension to preload $F_0$. Compensating spring has a threshold preload $F_T$ such that the spring is effectively inactive unless the system preload drops below $F_T$. The linear springs are capable of "winding" or collecting linkage belt slack, similar to a torsion spring winding slack around a sprocket.

The tensioners begin pinned in the position that would allow installation of the shortest allowable belt (not shown). If the shortest allowable belt is installed in this system, the linkage will not go "slack" and the preload will remain $F_0$. However, if a longer belt is installed, upon unpinning the tensioners, the linkage will go slack, and the primary spring will lose preload as it wound an intermediate amount of slack $\Delta L_i$ according to $\Delta F = k_p \Delta L_i$. This will occur until the system tension reaches the compensation threshold $F_T$. Once $F_T$ is reached, the compensating spring becomes active, and now both springs work to wind the remaining slack. The amount of slack wound by each is determined by the corresponding spring rates. Specifically, each spring winds slack according to $$\Delta L_p = \frac{\Delta F}{k_p} \text{ and } \Delta L_c = \frac{\Delta F}{k_c}.$$

This occurs until all of the slack is wound, and the result is the final system preload $F_F$. The final system preload with compensation mechanism is then given by:

$$F_F = \frac{\Delta L - \frac{F_T - F_0}{k_p}}{\frac{1}{k_p} + \frac{1}{k_c}} + F_T$$

However, without compensation the final preload would be given by:

$$F_F = F_0 + \Delta L k_p$$

The foregoing linear model can then be expanded to a rotational model. For example, in the invention primary spring 210 has a spring rate 0.0798 Nm/deg and is designed to be loaded to 2.11 Nm at installation on a belt of nominal length, for example, 1664 mm. Furthermore, compensating spring 100 is designed to be loaded to −1.89 Nm on the nominal belt—this is the threshold load. To prevent spring 100 from unloading, wrap spring 110 is employed. Wrap spring 110 provides frictional force to pivot arm 90 sufficient to generate a reaction moment large enough so the sum of the reaction moment and the compensating preload is equal to the torque on the primary spring 210. This load condition results in 100N of tension in the belt member 40, and an effective length of 108.2 mm. If the tensioner is installed on a belt that is 1668 mm, 4 mm longer than nominal but still within tolerance, the longer belt causes the tensioners to move inwards, toward one another as seen in FIG. 25.

The tensioner containing primary spring 210 moves inward by 5.6° and tensioner containing the compensating spring 100 moves inward by 5.8°. This angular change in equilibrium geometry leads to the effective linkage 40 length to shorten to 102.1 mm, which results in 6.1 mm of linkage slack. Without a compensating mechanism, the primary spring would deflect 16.6° in order to wind up the slack. For the given spring rate, this results in a loss of 1.33 Nm of preload. With a final preload of only 0.78 Nm, the belt 40 linkage tension will drop from 100N to 37.1N, a 62.9% loss.

With a compensating mechanism having compensating spring rate of 0.0077 Nm/deg however, the loss of preload is significantly less. This is because primary spring 210 will initially deflect 2.76°, winding only 1.01 mm of linkage 40 slack. At this point, the preload of spring 210 has dropped to the compensation threshold of 1.89 Nm. Once this occurs, wrap spring 110 disengages and allows compensating spring 100 to become active. Now both springs work together to wind the remaining 5.09 mm of belt linkage slack. Having the softer spring rate, compensating spring 100 deflects 12.8° and winds 4.7 mm of slack, while the stiffer spring 210 deflects 1.06° and winds the remaining 0.39 mm. This results in a final torsional preload of 1.79 Nm in both springs, which translates to a linkage tension of 85.3N. Once torsional equilibrium is established, wrap spring 110 re-engages and prevents belt linkage relaxation. With the given compensation mechanism, the same belt length and linkage length changes give an initial linkage tension loss of only 14.7%.

Figure 28:
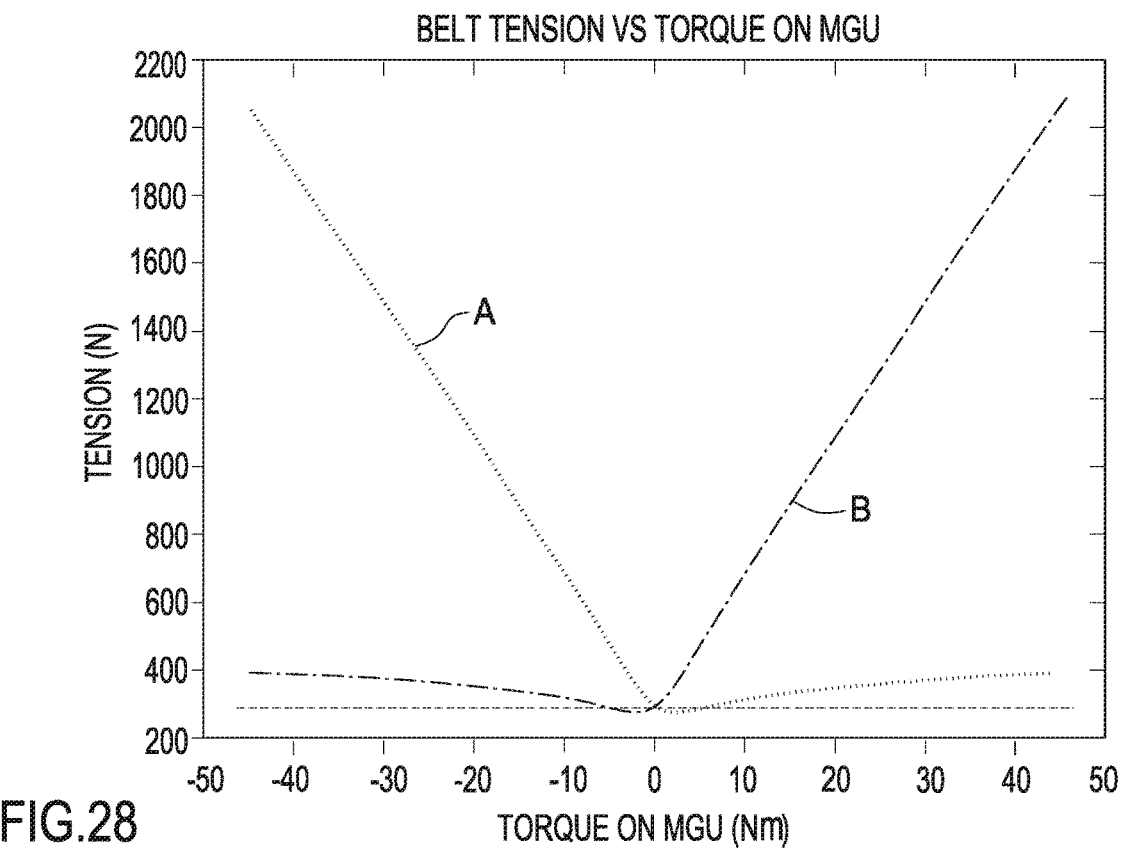
FIG. 28 is torque tension curves with stiff spring of subassembly 2.
Figure 29:
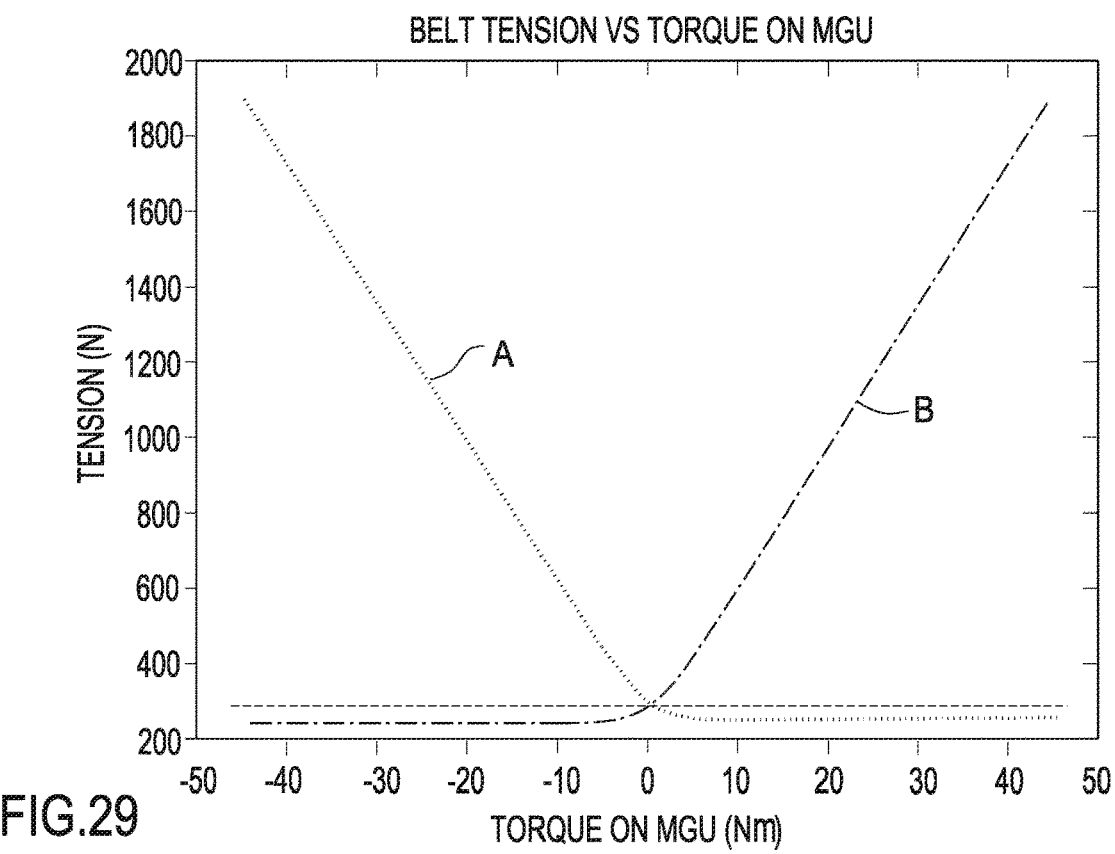
FIG. 29 is torque tension curves with soft spring of subassembly 2.

FIG. 28 shows the torque tension curves for a primary spring having spring rate of $$k_p = 0.0798 \frac{\text{Nm}}{\text{deg}}$$

and FIG. 29 shows the torque tension curves for a primary spring having spring rate of $$k_p = 0.00769 \frac{\text{Nm}}{\text{deg}}.$$

Curve A and Curve B are as described in FIG. 24. See FIG. 25 for a system schematic.

In FIG. 29, when torque is high, the tension in the slack side of B is below the install tension (when torque is zero), while the tension in the tight side of belt B is at a maximum. The large magnitude of this differential in tight and slack tensions is likely to lead to belt slippage.

On the other hand FIG. 28 shows that using a stiffer spring will cause tension in the slack side tension to rise well above the installation belt tension when torque is high. This reduces the magnitude of the tight-slack tension differential, and thus reduces the likelihood of belt slip.

The lower the spring rate of the compensating spring 100, the greater the portion of the linkage slack that is wound by the compensating spring, and ultimately the lower the preload loss. This is because once the threshold torque for compensation is reached, both springs undergo the same amount of loss of torsional preload. The softer the spring rate, the more it must deflect to achieve the same torsion change. The more deflection, the more linkage slack that is wound. However, with a softer spring rate, in order to preload it to a reasonable compensation threshold it must deflect a significant amount. If the spring rate is too soft, and the desired preload too high, the spring will break during loading.

Optimization of spring rates and preloads indicates it is preferable to set the compensation threshold equal to the main spring preload, and design the rest of the tensioner parameters according to what they should be for the shortest belt within tolerance. As a result, performance is as expected on a short belt, and as soon as a longer belt is installed and the main spring begins losing torque, the compensation mechanism activates. That is, there is no initial loss of preload in the main spring before the threshold is reached.

Figure 30:
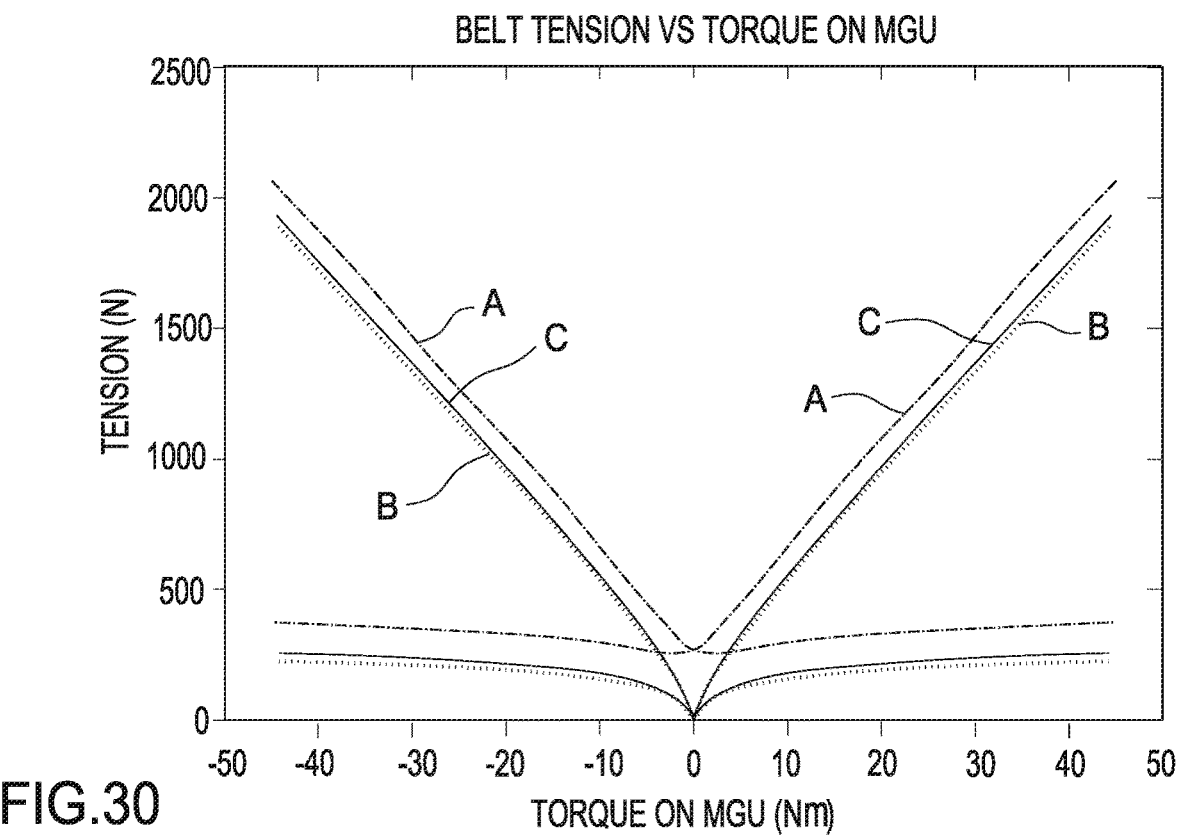
FIG. 30 is belt length variation graph without compensation.

FIG. 30 shows torque tension curves for the layout without a compensation spring for: the shortest new belt within tolerance (Curve A), a new belt of nominal length (Curve B), and the longest tolerable belt at end-of-life (EOL) (Curve C). In this example, for the nominal new belt and long end of life belt install tension drops to zero without compensation.

Figure 31:
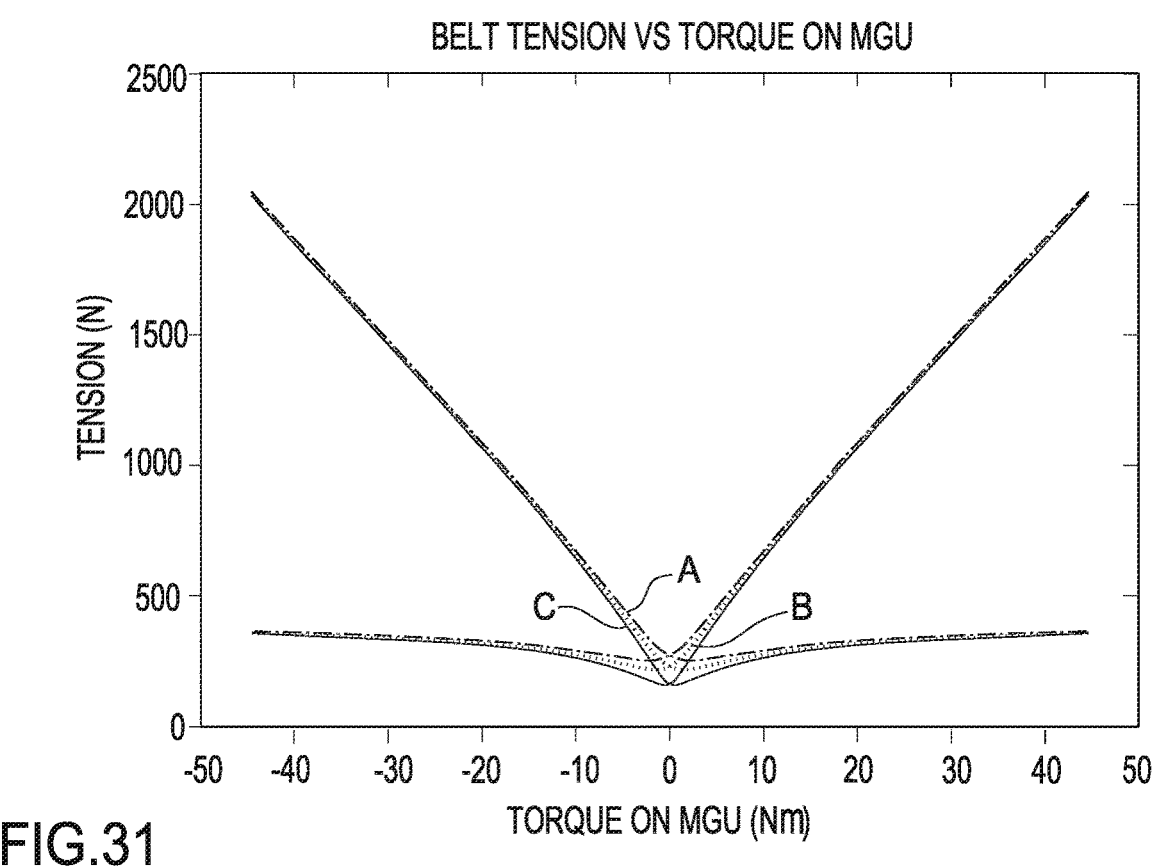
FIG. 31 is belt length variation with optimized compensation.

FIG. 31 shows the same layout analyzed with optimized compensation while holding all other input parameters the same as the case that gave the results shown in FIG. 30. There is less variation in installation tension, and tension at the extremes is nearly identical for each length of belt.

The inventive compensating mechanism allows for nominal preloads to be much lower than in prior art tensioners. The lower preload leads to lower belt tensions overall which eliminates the need for excessive belt installation tension necessary to accommodate belt length variation over the operating life of the system. This in turn provides for longer belt lifespans, longer component lifespans, and improved fuel economy.

A tensioner comprising a base, a first tensioner sub-assembly mounted to the base and comprising a one-way clutch, a first pivot arm and a first torsion spring loaded in a first direction, a first pulley journalled to the first pivot arm, a second tensioner sub-assembly mounted to the base and comprising a second pivot arm and a second torsion spring loaded in a second direction opposite the first direction, a second pulley journalled to the second pivot arm, the first sub-assembly cooperatively engaged with the second sub-assembly through an elongate flexible member and the one-way clutch, the first torsion spring and second torsion spring exert a tensile load on the elongate flexible member, and the one-way clutch frictionally engaged with the first pivot arm whereby a relative movement of the first pivot arm away from the second pivot arm is restricted for a predetermined operating condition.

A tensioner comprising a base, a first tensioner subassembly pivotally mounted to the base, a second tensioner subassembly pivotally mounted to the base, a tensile member joining the first tensioner subassembly and the second tensioner subassembly, the first tensioner subassembly urged in a direction opposite the second tensioner subassembly, and a one-way clutch frictionally engaged with the first tensioner subassembly whereby a relative movement of the first tensioner subassembly away from the second tensioner subassembly is restricted for a first predetermined operating condition and a relative movement of the first tensioner subassembly toward the second tensioner subassembly is not restricted for a second predetermined operating condition.

Although a form of the invention has been described herein, it will be obvious to those skilled in the art that variations may be made in the construction and relation of parts and method without departing from the spirit and scope of the invention described herein.

We claim:

1. A tensioner comprising:
a base;
a first tensioner sub-assembly mounted to the base and comprising a one-way clutch, a first pivot arm 90 and a first torsion spring loaded in a first direction, a first pulley journalled to the first pivot arm;
a second tensioner sub-assembly mounted to the base and comprising a second pivot arm and a second torsion spring loaded in a second direction opposite the first direction, a second pulley journalled to the second pivot arm;
the first sub-assembly cooperatively engaged with the second sub-assembly through an elongate flexible member 40 and the one-way clutch;
the first torsion spring and second torsion spring exert a tensile load on the elongate flexible member; and
the one-way clutch frictionally engaged with the first pivot arm whereby a relative movement of the first pivot arm away from the second pivot arm is restricted.

2. The tensioner as in claim 1, wherein the one-way clutch comprises a wrap spring that is radially expandable to frictionally engage the first pivot arm in a loaded condition.

3. The tensioner as in claim 2, wherein the one-way clutch is loaded in the unwinding direction.

4. The tensioner as in claim 1 further comprising:
a first sprocket rotationally engaged with the first pivot arm, the elongate tensile member engaged with the first sprocket, the first torsion spring engaged between the first pivot arm and the first sprocket; and
a second sprocket rotationally engaged with the second pivot arm, the second sprocket engaged with the elongate tensile member, the second torsion spring engaged between the second pivot arm and the second sprocket.

5. The tensioner as in claim 4, wherein the one-way clutch is engaged between the first sprocket and the first pivot arm.

6. A tensioner comprising:
a base;
a first tensioner sub-assembly mounted to the base and comprising a one-way clutch, a first pivot arm, a first torsion spring loaded in a first direction, a first pulley journalled to the first pivot arm;
a first sprocket rotationally engaged with the first pivot arm, the first sprocket engaged with an elongate tensile member, the first torsion spring engaged between the first pivot arm and the first sprocket, the one-way clutch engaged with the first sprocket;
a second tensioner sub-assembly mounted to the base and comprising a second pivot arm, a second torsion spring loaded in a second direction opposite the first direction, a second pulley journalled to the second pivot arm;
a second sprocket rotationally engaged with the second pivot arm, the second sprocket engaged with the elongate tensile member, the second torsion spring engaged between the second pivot arm and the second sprocket;
the first torsion spring and second torsion spring exert a tensile load on the elongate flexible member; and
the one-way clutch frictionally engaged with the first pivot arm whereby a relative movement of the first pivot arm away from the second pivot arm is restricted for a predetermined operating condition.

7. A tensioner comprising:
a base;
a first tensioner subassembly pivotally mounted to the base;
a second tensioner subassembly pivotally mounted to the base;
a tensile member joining the first tensioner subassembly and the second tensioner subassembly;
the first tensioner subassembly urged in a direction opposite the second tensioner subassembly; and
a one-way clutch frictionally engaged with the first tensioner subassembly whereby a relative movement of the first tensioner subassembly away from the second tensioner subassembly is restricted for a first predetermined operating condition and a relative movement of the first tensioner subassembly toward the second tensioner subassembly is not restricted for a second predetermined operating condition; wherein: the first tensioner sub-assembly further comprises a first pivot arm and a first torsion spring loaded in a first direction, a first pulley journalled to the first pivot arm; and the second tensioner sub-assembly further comprises a second pivot arm and a second torsion spring loaded in a second direction opposite the first direction, a second pulley journalled to the second pivot arm.

8. The tensioner as in claim 7, wherein:
a first sprocket rotationally engaged with the first pivot arm, the first sprocket engaged with the tensile member, the first torsion spring engaged between the first pivot arm and the first sprocket;
a second sprocket rotationally engaged with the second pivot arm, the second sprocket engaged with the tensile member, the second torsion spring engaged between the second pivot arm and the second sprocket; and
the one-way clutch is frictionally engaged between the first sprocket and the first pivot arm.

* * * * *